(12) United States Patent
Dolph et al.

(10) Patent No.: US 7,456,848 B2
(45) Date of Patent: Nov. 25, 2008

(54) METHOD FOR CONSOLIDATING OVERLAPPING MAP MARKERS

(75) Inventors: Blaine H. Dolph, Western Springs, IL (US); Christopher Joseph Gansen, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 11/419,110

(22) Filed: May 18, 2006

(65) Prior Publication Data
US 2007/0268310 A1 Nov. 22, 2007

(51) Int. Cl.
*G09G 5/00* (2006.01)
(52) U.S. Cl. .................. 345/629; 701/200; 345/619
(58) Field of Classification Search .................. 345/629
See application file for complete search history.

(56) References Cited

U.S. PATENT DOCUMENTS

| | | | |
|---|---|---|---|
| 5,377,314 A | | 12/1994 | Bates et al. |
| 5,553,209 A | * | 9/1996 | Johnson et al. ............. 345/667 |
| 6,067,502 A | * | 5/2000 | Hayashida et al. .......... 701/209 |
| 6,356,281 B1 | | 3/2002 | Isenman |
| 6,973,386 B2 | * | 12/2005 | Gibbs ......................... 701/208 |
| 6,995,778 B2 | * | 2/2006 | Noble et al. ................. 345/632 |
| 2002/0175923 A1 | | 11/2002 | Lin et al. |
| 2005/0034075 A1 | * | 2/2005 | Riegelman et al. .......... 715/714 |
| 2005/0083325 A1 | | 4/2005 | Cho |
| 2006/0058952 A1 | | 3/2006 | Cooper et al. |
| 2007/0219659 A1 | | 9/2007 | Abhyanker et al. |

OTHER PUBLICATIONS

U.S. Appl. No. 11/419,096, filed May 18, 2006, Dolph et al.

* cited by examiner

*Primary Examiner*—Kee M. Tung
*Assistant Examiner*—Michelle K Lay
(74) *Attorney, Agent, or Firm*—Duke W. Yee; David A. Mims, Jr.; Gerald H. Glanzman

(57) ABSTRACT

A computer implemented method for consolidating overlapping markers in a mapping application. The process identifies a plurality of points for display from data describing locations and associated data about locations. The process then determines whether displaying graphical indicators for a set of points in the plurality of points will result in graphical indicators overlapping each other. The process generates a consolidated marker for the set of points, in response to a determination that displaying graphical indicators for the set of points will result in graphical indicators overlapping each other. The process then associates a listing for the set of points with the consolidated marker. The listing comprises at least a portion of the associated data about locations for the plurality of points.

12 Claims, 8 Drawing Sheets

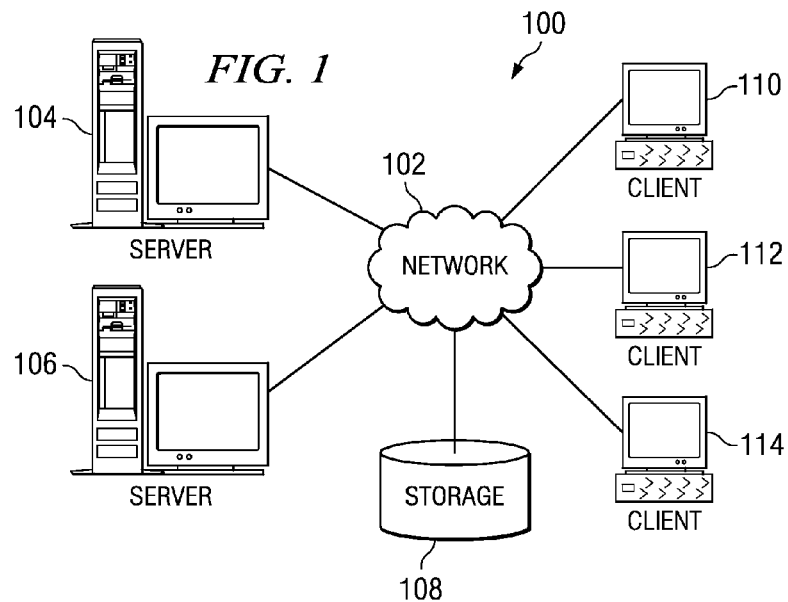

A. 1 Boat Operator
Aerotek is currently searching for boat Operators to help in the relief efforts from Hurricane Katrina and Rita. Boat drivers will be responsible for operating
From Thingamajob.com – 1 hours, 12 minutes ago A. 2 Store Human Resources Manager – Harahan, LA
XXCAThr Position Detail Company Corporate Careers Post Date 09slash30slash2005 Title Store Human Resources Manager dash Harahan, LA Req # 25353 Job Ca...
From Home Depot USA, Inc. – 2 days, 22 hours ago

Industrial Hygienist
Due to recent destruction of Hurricane Katrina and Hurricane Rita in the Gulf, a leading environmental management company is seeking qualified candidates to
From Thingamajob.com – 1 hours, 12 minutes ago A. 3 Retail Sales Consultant, Harahan
Position Title: Retail Sales Consultant, Harahan Requisition Number: 64077 Functional Area: Sales dash Retail Location: LA0096 Harahan...
From Cingular Wireless – 11 days ago

Oracle 11i Financials(Technical)
We need Oracle Financials Technical Consultants with Conversions and Interfaces experience. Immediate start. Please rush your resumes to bindu@pkglobal.com Tr
From Dice – 1 hours, 48 minutes ago

520 {

B. 1 Applications Controls Engineer
Applications Controls Engineer 00040130 Job Description Apply Online Description Enables plant productivity gains using advanced t...
From Honeywell – 5 days, 5 hours ago B. 2 Websphere Administrator
3IL Ref # – 2248 Job Title – Websphere Administrator* Resume Due Date ASAP Project Start Date ASAP Project End Date – 1 yr. Project Location – Baton Rouge L
From Dice – 1 hours, 49 minutes ago F. Mine Maintenance Mechanic
Job Title : Mine Maintenance Mechanic Org Unit : SALT Area

FIG. 8

```
function map_to_pixels(MapPoint p)
{
    x_pixels = [ (p.x - left_bound) / (right_bound - left_bound) ] * bounding_box_width_in_pixels;      — 820
    y_pixels = [ (p.y - top_bound) / (bottom_bound - top_bound) ] * bounding_box_height_in_pixels;     — 830 return array(x_pixels, y_pixels);
}
```
810 encompasses the function body

FIG. 9

```
function detect_overlap(Point A, Point B)
{
    if ( [ left bound of A is between the left and right bounds of B OR right bound of A is in between left and right bounds of B] AND
         [ bottom bound of A is between upper and lower bounds of B OR top bound of A is between upper and lower bounds of B])
    then
            points overlap            — 920
    else
            points do not overlap     — 930
}
```
910 encompasses the if-condition; 900 encompasses the whole function

METHOD FOR CONSOLIDATING OVERLAPPING MAP MARKERS

BACKGROUND OF THE INVENTION

1. Field of the Invention

The present invention relates generally to an improved data processing system and in particular to a method and apparatus for displaying maps. Still more particularly, the present invention relates to a computer implemented method, apparatus, and computer usable program product for consolidating overlapping markers in a mapping application.

2. Description of the Related Art

Currently, many applications use geospatial data to enhance the user experience. Geospatial data is information that is both geographic and spatial pertaining to a location of natural or constructed features, objects, and/or structures. For example, latitude and longitude coordinates are a type of geospatial data. Geospatial data can be used to enhance application functions. Many data providers are now tagging data with latitude and longitude coordinates.

In addition, the advent of mapping applications that are freely available to users, such as Google® maps, enable users to easily integrate geospatial data into a map display. For example, the Chicago police now plot the occurrence of crimes by the type of crime and geographic location of crimes across Chicago neighborhoods. As another example, Google® mapping functions permit users to obtain driving directions using maps.

When geospatial data is integrated into a map display, each location point associated with geospatial data is typically represented as a graphical marker, icon, or indicator on a map display. When large data sets representing a plurality of points are mapped, the indicators may overlap. This overlap can occur where two or more points actually have the same location. In addition, overlap can also occurs where points have different locations but graphic indicators representing the points overlap due to the zoom level of the map view. For example, where two points are located in different locations but in close proximity to each other, the graphical indicators for the two points may overlap in a zoomed-in view, but appear as distinct, non-overlapping indicators when the map is viewed in a zoomed-out view.

The overlapping of graphic indicators or icons representing points and/or locations on a map results in problems because the overlap hides or obscures some of the data such that a user cannot clearly view each point and/or location indicator. This overlap can cause confusion to a user attempting to locate an indicator that is hidden or obscured by another indicator.

SUMMARY OF THE INVENTION

The different illustrative embodiments provide a computer implemented method for consolidating overlapping markers in a mapping application. The process identifies a plurality of points for display from data describing locations and associated data about locations. The process then determines whether displaying graphical indicators for a set of points in the plurality of points will result in graphical indicators overlapping each other. The process generates a consolidated marker for the set of points, in response to a determination that displaying graphical indicators for the set of points will result in graphical indicators overlapping each other. The process then associates a listing for the set of points with the consolidated marker. The listing comprises at least a portion of the associated data about locations for the plurality of points.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which illustrative embodiments may be implemented;

FIG. 2 is a block diagram of a data processing system in which illustrative embodiments may be implemented;

FIG. 5 is a result set list of plotted points represented by a set of consolidated markers in accordance with an illustrative embodiment;

FIG. 8 is an example of an algorithm for converting geospatial data associated with a data set to pixel values to form a set of plotted points; and FIG. 9 is an overlap-detection function for identifying a pair of overlapping graphic indicators for a pair of points in accordance with an illustrative embodiment.

DETAILED DESCRIPTION OF THE PREFERRED EMBODIMENT

Figure 3A:
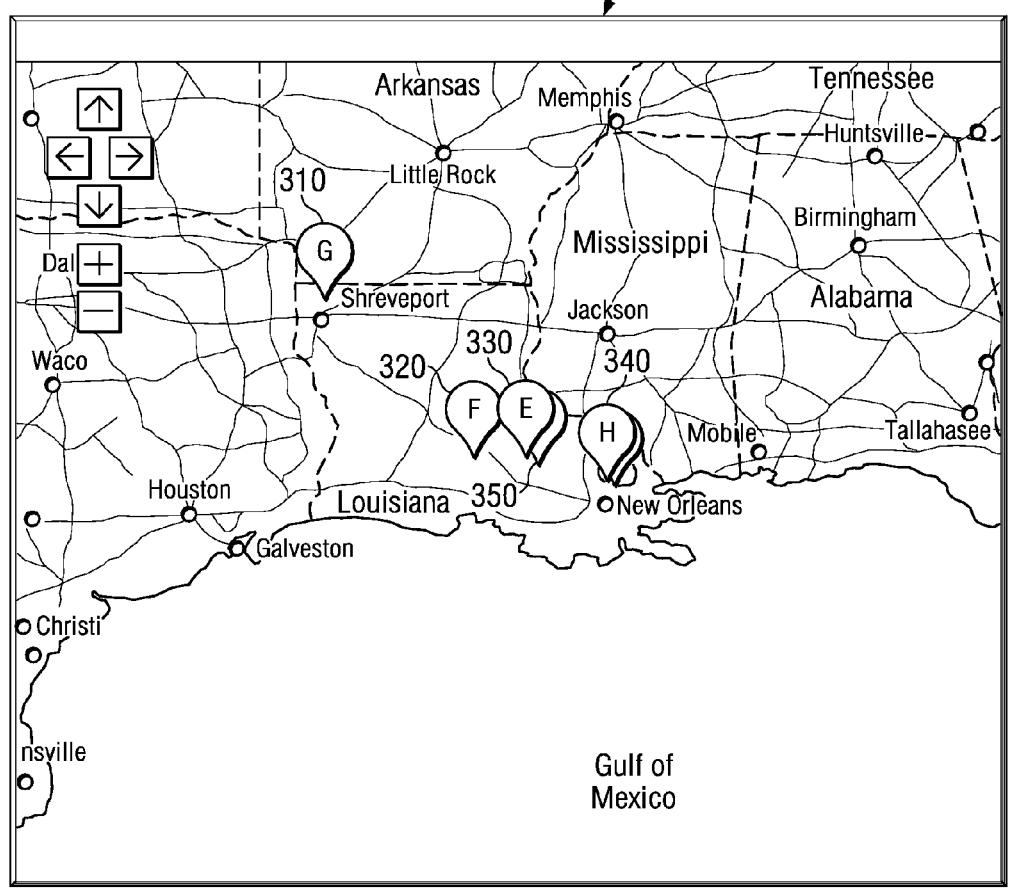
FIG. 3A is a block diagram of a map display showing a currently used display of overlapping graphic indicators.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Today, many data providers are tagging their data with geospatial data. Geospatial data is information pertaining to one or more of a geographic location of natural and/or constructed features, structures, and/or objects. Geospatial data includes data that is both geographic and spatial. For example, latitude and longitude coordinates are a type of geospatial data. Mapping applications, such as Google® maps, enable users to integrate geospatial data into a map display to represent information, such as a set of locations or addresses, as one or more graphic indicators rendered in association with the map display.

As used herein, a point is a place, position, or locality. Each mapped point is represented on a map display by a graphic indicator. As used herein, a graphic indicator is any type of graphic, icon, image, character, word, or image rendered on a map display to represent a point relative to a map display bounding box and/or one or more other points associated with the map display. A bounding box is the smallest upright rectangle which entirely encloses a figure on a display, such as a map display. Thus, a map display bounding box is the smallest upright rectangle which entirely encloses the map display. A graphic indicator bounding box is the smallest upright rectangle which entirely encloses the graphic indicator.

When data describing locations and associated data about locations are representing a plurality of points are rendered on a map display, the graphic indicators associated with the plurality of points rendered on the map may overlap where the points are located at the same coordinates as one or more other mapped points or in close proximity to one or more other mapped points. The degree of overlap that occurs between a given pair of graphic indicators is influenced by the zoom level of a map display view. Thus, two graphical indicators may overlap in a zoomed-in view, but appear as distinct, non-overlapping indicators when the map is viewed in a zoomed-out view.

For example, if a user conducts a search to find a list of available jobs within a particular geographic area, the search will return a result data set. In such an example, the returned result data set will include a list of available jobs and/or locations, such as the following:
A Boat Operator
B Store Human Resources Manager-Harahan, LA
C Retail Sales Consultant, Harahan
D Applications Controls Engineer
E Websphere Administrator
F Mine Maintenance Mechanic
G Industrial Hygienist
H Oracle 11*i* Financials (Technical)

In this example, each available job is associated with an alphanumeric identifier. The identifiers in this example range from A to H. inclusive. Each available job location can be rendered on a map display as a graphic indicator labeled with the appropriate identifier associated with the given available job. The set of graphic indicators associated with the listing of available jobs are rendered on a map display to represent the location of each available job in a result data set.

Referring now to FIG. 3A, which is a block diagram of a map display showing a currently used display of overlapping graphic indicators, some of the graphic indicators overlap. Map display 300 is any type of graphic map display generated by a mapping application, such as Google® maps. Map display 300 is rendered in association with a plurality of points represented on map display 300 as a plurality of graphic indicators 310-340.

For example, as shown in FIG. 3A, graphic indicators for points represented by graphic indicator G 310, graphic indicator F 320, graphic indicator E 330, and graphic indicator H 340 are visible on the map display. However, graphic indicator A, graphic indicator B, graphic indicator C, and graphic indicator D are hidden or obscured by graphic indicator F 320, graphic indicator E 330, and graphic indicator H 340 due to overlap of the graphic indicators at the given zoom level for the map view shown in FIG. 3A. As used herein, the term overlap refers to the obscuring or hiding of a portion or all of a graphical indicator by one or more other graphical indicators rendered on the same display Thus, a graphic indicator may overlap with only one other graphic indicator, such as in a single layer overlap, or a graphic indicator may be overlapped by multiple other graphic indicators, such as a multiple layer or stacked overlap.

Figure 3B:
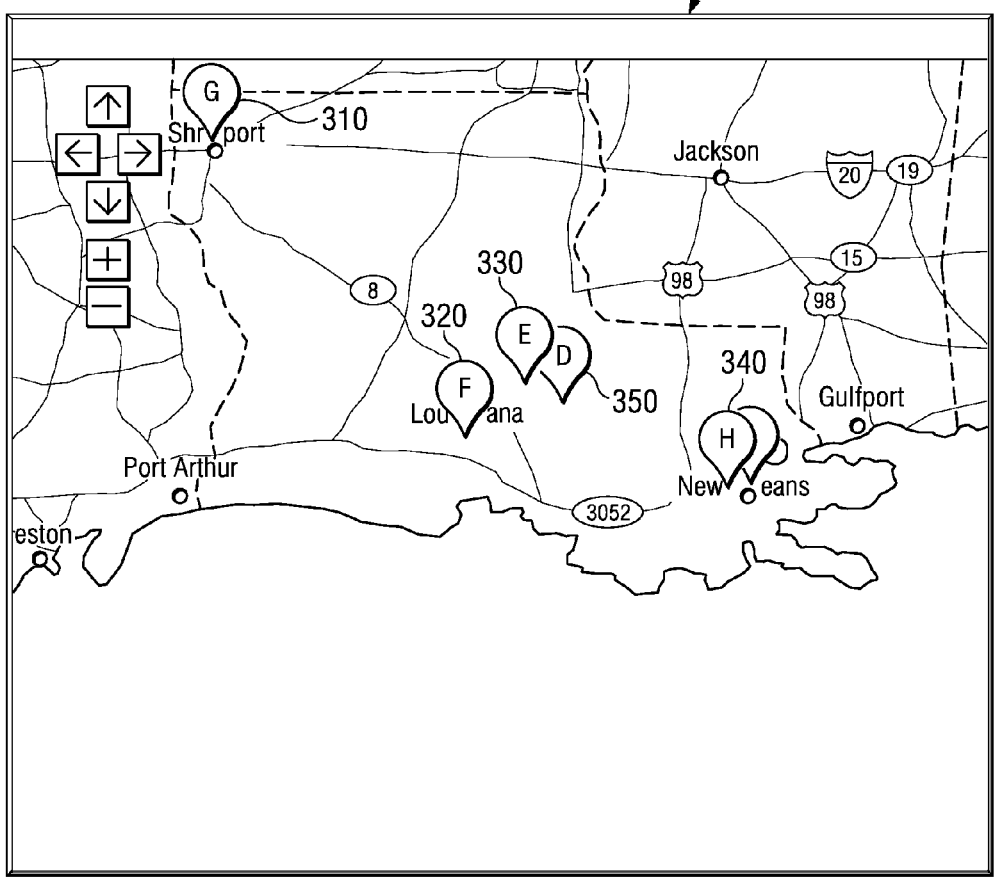
FIG. 3B is a block diagram of a map display showing another currently used display of overlapping graphic indicators at a different zoom level.

Referring now to FIG. 3B, a block diagram of a map display showing another currently used display of overlapping graphic indicators is shown at a different zoom level. Map display 300 is any type of graphic map display generated by a mapping application, such as Google® maps. Graphic indicator D 350, which was completely hidden or obscured at the zoom level shown in FIG. 3A is partially visible at the zoom-in view of map display 300 shown in FIG. 3B.

The term "zoom-in" refers to decreasing the field of vision/display by changing the view from wide to a narrower. Zooming-in typically increases the amount of detail over a narrower or smaller area of a map or image, such as the effect of increasing a magnification level. The term "zoom-out" refers to increasing the field of vision by changing the view from narrow to a wider view. Zooming-out typically displays a larger or wider area but with a decreased amount of detail over that area, such as the effect of decreasing a magnification level. Generally, mapping functions provide multiple levels of zoom-in and zoom-out. A zoom level refers to the particular level of zoom-in or zoom-out option enabled by a user in regard to a particular map display.

In addition, a graphical marker may be overlapped by another graphical marker in whole or in part. In accordance with one illustrative example, a graphical marker is overlapped by another graphical marker if an identifier associated with the graphical marker is overlapped, hidden, or obscured by another graphical marker. In this illustrative example, graphic marker D 350 is partially hidden or overlapped by graphic marker E 330. However, because graphical marker D 350 has an identifier "D" that is not blocked, hidden, or otherwise obscured by graphic marker E 330, graphic marker E 330 does not overlap with graphic marker D 350. In other words, graphic marker E 330 does not overlap with graphic marker D 350 because an identifier "D" associated with graphic marker D 350 is not obscured by the other given graphical marker on the map display. However, in accordance with this example, graphic marker E 330 and graphic marker D 350 could be overlapping or hiding one or more other graphical markers that are not visible in this zoom level.

Figure 3C:
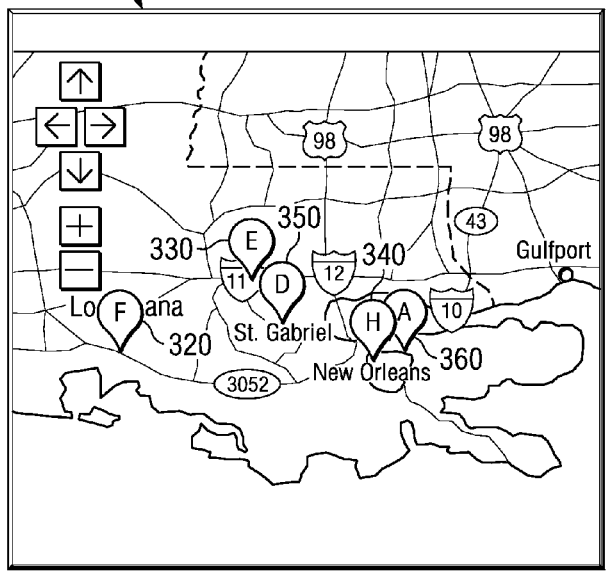
FIG. 3C is another block diagram of a map display showing a currently used display of overlapping graphic indicators with a diminishing overlap of graphic indicators at a different zoom level.

FIG. 3C is another block diagram of a map display showing a currently used display of overlapping graphic indicators with a diminishing overlap of graphic indicators at a different zoom level. Map display 300 is any type of graphic map display generated by a mapping application, such as Google® maps. In this illustrative example, a user has zoomed-in to increase a magnification level of the map display. Graphic indicator D 350, which was completely obscured in FIG. 3A and partially obscured in FIG. 3B, is completely visible to a user at the zoom level of the map display shown in FIG. 3C. In addition, graphic indicator A 360, which was obscured in FIGS. 3A and 3B, is partially visible at the zoom-in level illustrated in FIG. 3C. Thus, as a user zooms-in, such as to increase the magnification level of the map display, the overlap of graphic indicators may be diminished. However, even at the zoomed-in view shown in FIG. 3C, graphic indicator B and graphic indicator C are still not visible to a user. The overlapping of graphic indicators obscures mapped points such that a user cannot clearly view each mapped point. This obscuring of mapped points can additionally lead to user confusion.

Therefore, the different aspects of the illustrative embodiments provide a computer implemented method, apparatus, and computer usable code for consolidating overlapping markers in a mapping application. The process identifies a plurality of points for display from data describing locations and associated data about locations. The process then determines whether displaying graphical indicators for a set of points in the plurality of points will result in overlapping graphical indicators. The process generates a consolidated marker for the set of points, in response to a determination that displaying graphical indicators for the set of points will result in overlapping graphical indicators. The consolidated marker does not overlap with any other graphic indicator or consolidated graphic marker displayed on map display. The process then associates a listing for the set of points with the consolidated marker. The listing comprises at least a portion of the associated data about locations for the plurality of points.

As used herein, a plotted point is a mapped point with pixel values representing the location of the point relative to a particular map display and/or relative to one or more other points associated with the map display. An overlapping marker is a graphic marker that overlaps, in whole or in part, with one or more other graphic markers in a set of graphic markers. The set of overlapping graphic markers includes two or more graphic markers. In addition, a plotted point in the set of points may be associated with a graphic indicator that overlaps with a single other graphic indicator, as well as two or more other graphic indicators.

Thus, each graphic indicator in the set of overlapping indicators overlaps, in whole or in part, with at least one other graphic indicator in the set of overlapping graphic indicators when rendered on a particular map display at a given zoom level. Thus, a plotted point that is represented by an overlapping indicator in one zoom level may not be represented by an overlapping indicator at a different zoom level for the map display.

Figure 4A:
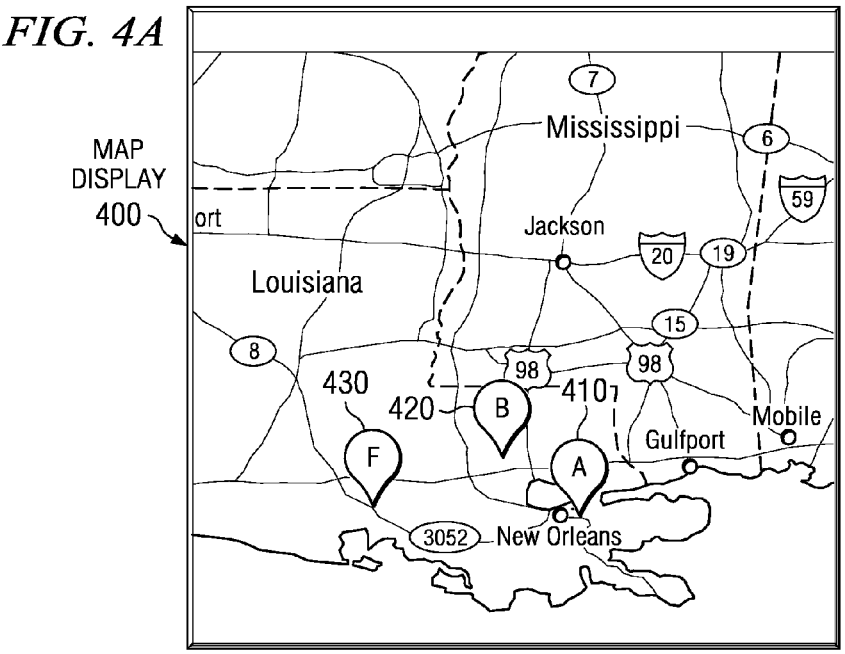
FIG. 4A is a block diagram of a map display showing two consolidated markers in accordance with an illustrative embodiment.

FIG. 4A depicts a block diagram of a map display showing two consolidated markers in accordance with an illustrative embodiment. Map display 400 is any type of graphic map display generated by a mapping application, such as Google® maps. Map display 400 is rendered with two consolidated markers, consolidated marker A 410 and consolidated marker B 420, in addition to unconsolidated graphic indicator F 430.

Consolidated marker A 410 is a single graphic marker representing a first identified set of points in the plurality of plotted points. If graphical indicators representing each point in the set of point were displayed, the display of the graphical indicators would would result in overlapping graphical indicators, as shown in FIG. 3A, FIG. 3B, and FIG. 3C.

Consolidated marker B 420 is also a consolidated marker representing a second identified set of points. If graphical indicators representing each point in the second identified set of points were displayed, the display of the graphical indicators would also result in overlapping graphical indicators. The second set of points includes two or more plotted points in the plurality of points. As used herein, a consolidated graphic marker is a graphic indicator that represents two or more points in the plurality of points. Graphic indicator F 430 is a non-consolidated graphic indicator. Graphic indicator F 430 only represents a single plotted point in the plurality of points.

In this illustrative example, consolidated marker A 410 and consolidated marker 420 are inverted tear-drop shaped graphic markers. However, in accordance with the illustrative embodiments, a consolidated graphic marker can be displayed as a graphic having any shape, size, color, symbol, shading, border, animation, or design. For example, a consolidated graphic marker can be rendered in a square shape, rectangular shape, cube shape, a circle, an oval, a donut shape, a star, a letter, a number, a thumbnail image, or any other shape or size of a graphic or image to indicate a point or location on a map display.

In accordance with another illustrative embodiment, a consolidated graphic marker that represents two or more points is rendered or displayed in a different manner than an unconsolidated graphic indicator that represents only a single point. A consolidated marker is rendered or displayed in a different manner by rendering/displaying the graphic marker with a different border, shading, color, size, or shape than an unconsolidated graphic indicator. For example, all consolidated graphic markers are displayed with a dark border or dark shading and all unconsolidated indicators are displayed with no border or dark shading. As another example, consolidated graphic markers are displayed with a particular color and unconsolidated graphic indicators are displayed without any color or with black, white, and gray color only.

In accordance with another example, consolidated markers are displayed as an animated graphic and unconsolidated indicators are displayed as static or non-animated graphics. An animated graphic is a graphic marker or indicator that that strobes, changes size, changes shape, and/or is associated with any other movement or motion. The animated marker indicates to a user that a marker is a consolidated marker that represents more than one point on a map display.

In accordance with an illustrative embodiment of the present invention, a consolidated graphic marker is displayed in association with an identifier and a number. The identifier identifies the point and the number identifies the number of points represented by the consolidated marker. For example, if a consolidated marker identified with the identifier A represents three points on a map display, consolidated marker A is displayed on a map display as a graphic associated with an identifier A and number 3, such as "A.3." A user can quickly determine that graphic marker A is a consolidated marker that represents three different points on the map display.

In accordance with another illustrative example, a consolidated marker can be displayed as a graphic having a grid lines to create an appearance of subparts. A user can determine the number of points represented by a consolidated marker by counting the number of subparts created by the grid lines. For example, a consolidated marker A can be displayed as a circle with grid lines creating slices in the circle. Therefore, if a consolidated marker A represents three points, consolidated marker A can be displayed on map display as a circle with three wedges or slices.

Likewise, a consolidated marker can be displayed as a square or rectangle having grid lines that create an appearance of two or more subparts or subsections. A user can determine the number of points represented by the consolidated marker by counting the number of subparts of the consolidated marker. Therefore, if a consolidated marker B represents two points, a square shaped marker divided in half is displayed on map display to indicate that marker B is a consolidated marker representing two points on the map display.

Figure 4B:
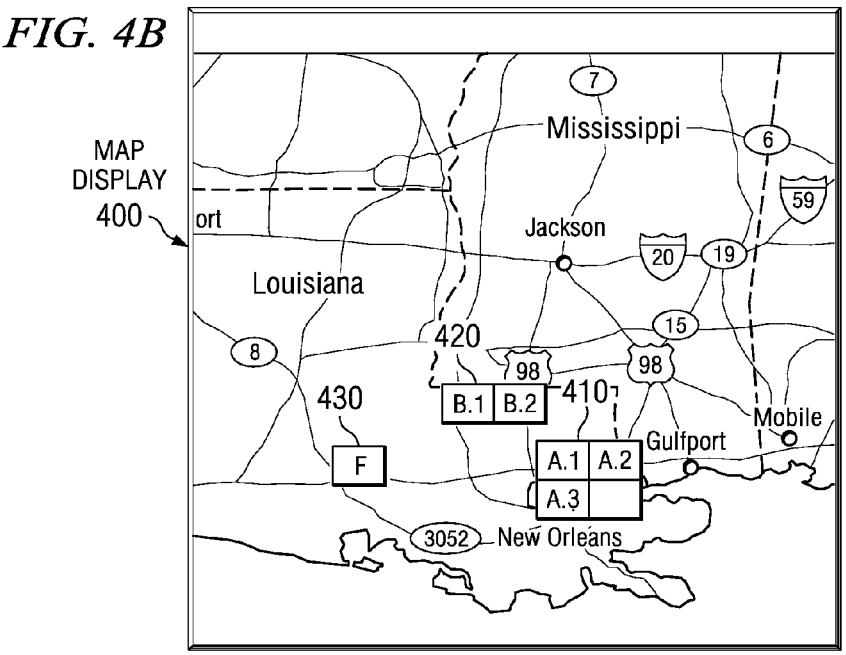
FIG. 4B is a block diagram of a map display showing two numbered consolidated markers in accordance with an illustrative embodiment.

In accordance with the illustrative embodiments, the methods for displaying consolidated markers in different manners, displaying a consolidated marker as a graphic with numbers and/or subdivisions can be combined and/or modified in order to indicate to a user that a given graphic marker is a consolidated graphic marker representing a given number of points. For example, FIG. 4B is a block diagram of a map display showing two numbered consolidated markers in accordance with an illustrative embodiment. Consolidated graphic marker A 410 and consolidated graphic marker B 420 are square shaped graphic markers having a grid to form subparts or subsections within each consolidated graphic. Each consolidated marker is displayed in association with a letter identifier identifying the marker and a number corresponding to the number of points in the set of points represented by the consolidated marker.

In accordance with this example, a user can determine the number of points represented by a consolidated marker by viewing the number of subparts and/or the numbers displayed in association with the consolidated marker. For example, the numbers on consolidated graphic marker A 410 are as follows: A.1, A.2, and A.3. A user can quickly determine that three points, identified as A.1, A.2, and A.3, are represented by consolidated marker A 410. Likewise, consolidated marker B 420 is a numbered graphic marker displayed as a square with two subsections. A user can quickly and easily determine that marker B 420 is a consolidated marker representing two points, identified as B.1 and B.2, based on the number of subsections and/or the numbers displayed in association with consolidated marker B 420. A user can likewise determine that graphic marker F 430 is not a consolidated marker because graphic marker F 430 is a graphic without grid lines and is not displayed in association with a number.

In accordance with the aspects of the illustrative embodiments, a user selects a consolidated marker to view a second display result set listing each plotted point represented by the consolidated marker. A user can select a consolidated marker by clicking on the marker using a mouse pointer, control keys, or by any other means known or available for selecting a graphic marker or icon. The result set listing is displayed in a second window on the same display screen in conjunction with the display map or on a second display screen separate from the first map display screen.

In accordance with another illustrative example, a user does not have to select the consolidated marker to view the result set list. The mapping application automatically displays the result set list simultaneously with the display map when a set of overlapping graphic markers are consolidated into a single consolidated marker. Each consolidated marker is clearly visible and un-obscured by any other graphic when rendered on map display 400.

In another illustrative example, if the set of points represented by a given consolidated marker exceeds a threshold number, such as twelve points, the set of points can be consolidated into multiple consolidated markers. In this example, the twelve graphical indicators representing the twelve points are consolidated into two consolidated markers, consolidated marker A and consolidated marker B. Consolidated marker A and consolidated marker B are then displayed in a fanned manner to prevent overlap of the consolidated markers. Consolidated marker A and consolidated marker B are displayed in as a set of fan-shaped markers about a central point associated with the twelve graphical indicators. In other words, consolidated marker A and consolidated marker B are displayed as two wedge-shaped consolidated graphic markers at a central point to form a fan-shaped set of consolidated markers.

In accordance with this illustrative example, a second display screen would provide two sets of data describing locations and associated data about locations for consolidated marker A and consolidated marker B. In another illustrative embodiment, a second display window and/or display screen is provided that includes the associated data about locations for the plurality of points represented by consolidated marker A. A third display window and/or display screen is provided that includes the associated data about locations for the plurality of points represented by consolidated marker B.

FIG. 5 is a result set list of plotted points represented by a set of consolidated markers in accordance with an illustrative embodiment. In this example, the following job listings illustrated in result subset 510 are represented by graphic marker A 410 in FIG. 4:
A.1 Boat operator
A.2 Store Human Resources Manger-Harahan, LA
A.3 Retail Sales Consultant-Harahan In accordance with this illustrative embodiment, consolidated marker A 410 in FIG. 4 represents three plotted points. A user views the second display providing the result set list to determine which plotted points are represented by a given consolidated marker.

In this example, the following job listings illustrated in the result subset 520 are represented by graphic marker B 420 in FIG. 4:
B.1 Applications controls engineer
B.2 Websphere Administrator In accordance with this illustrative embodiment, consolidated marker B 420 in FIG. 4 represents two plotted points. Thus, multiple lines of the result set list point to the same identifier identifying a given consolidated marker.

The process of the illustrative embodiments convert data describing locations and associated data about locations, such as geospatial data, to pixel values to form a plurality of plotted points. The pixel value associated with a particular plotted point identifies a location associated with the map display for a point represented by geospatial data relative to a bounding box for the map display. The process converts geospatial data to pixel values based on latitude and longitude coordinates for a point and a physical distance between pixels associated with the given map display.

Each plotted point is represented as a unique graphical indicator with an identifier on a given map display. In the illustrative examples, the identifier is a letter from the alphabet. However, in accordance with the aspects of the illustrative embodiments, the identifier can include any letter, number, symbol, word, mark, color, or any other means or method for identifying a given graphic indicator.

Figure 6:
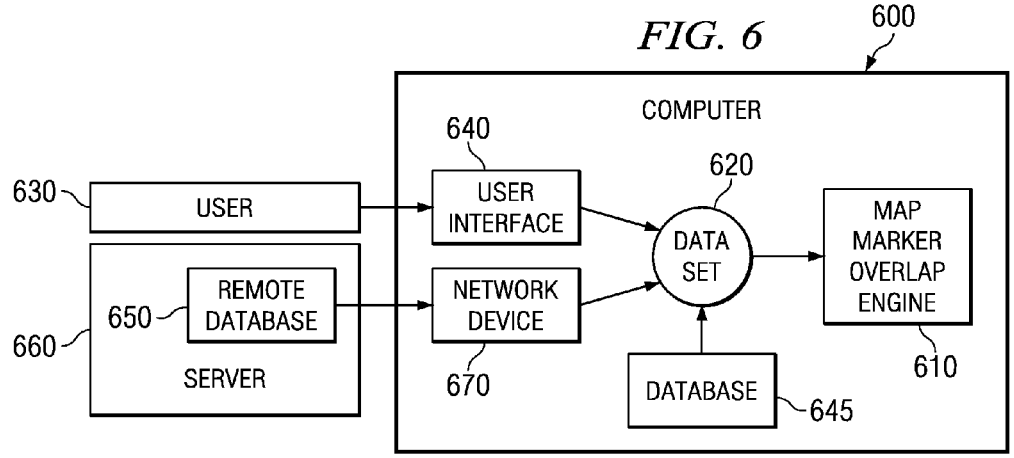
FIG. 6 is a block diagram illustrating a dataflow when the process identifies a set of overlapping graphical indicators for consolidation into a single consolidated marker linked to a second result set display in accordance with an illustrative embodiment.

FIG. 6 is a block diagram illustrating a dataflow when the process identifies a set of overlapping markers for consolidation into a single consolidated graphic marker linked to a second result set display in accordance with an illustrative embodiment. Computer 600 is any type of computing device, such as a personal computer, laptop, personal digital assistant, or any other computing device depicted in FIGS. 1 and 2. Map marker overlap engine 610 is a mapping application. Map marker overlap engine 610 converts geospatial data associated with a data set into pixel values associated with a given map display to form a plurality of plotted points. Map marker overlap engine 610 identifies set(s) of overlapping graphic indicators representing a given set of points in the plurality of plotted points and consolidates each set of overlapping indicators as a single consolidated marker. In other words, map marker overlap engine 610 determines whether displaying graphical indicators for a set of points in the plurality of points will result in overlapping graphical indicator. If displaying the graphical indicators for the set of points will result in overlapping graphical indicators, map marker overlap engine 610 generates a consolidated marker for the set of points.

The consolidated marker represents all the plotted points associated with the set of overlapping graphic indicators. The consolidated marker is linked to a result set list providing a listing of each plotted point in the set of points represented by the consolidated marker. The result set list is provided in a second display for viewing by a user in conjunction with the consolidated marker associated with the result set list. The listing includes at least a portion of the associated data about locations for the plurality of points.

In accordance with this illustrative embodiment, map marker overlap engine 610 receives the data set and associated geospatial data as a data set, such as data set 620. Data set 620 includes data describing locations and associated data about locations.

Data set 620 can be received from a plurality of different sources. In this illustrative example, user 630 provides data set 620 to map marker overlap engine 610 via user interface 640. User interface 640 is any type of known or available interface for providing input to computer 600, including but not limited to, a graphical user interface (GUI), a menu-driven interface, and/or a command line interface.

Map marker overlap engine 610 can also retrieve and/or receive data set(s), such as data set 620, from a local database located on computer 600, such as database 645. Database 645 is a database for storing information, such as locations, addresses, or any other data in conjunction with geospatial data associated with the stored information. Database 645 is located on or locally to computer 600.

In addition, map marker overlap engine 610 also receives data set(s), such as data set 620, from a remote database, such as remote database 650. Remote database 650 is any type of database for storing a collection of data that is not located on computer 600. In this illustrative example, remote database 650 is located on server 660.

Server 660 is any type of server, such as server 104 and 106 in FIG. 1. Server 660 can be a server on a network, such as network 102 described in FIG. 1. Computer 600 accesses remote database 650 on server 660 through a network connection via network device 670.

Network device 670 is any type of network access software known or available for allowing computer 600 to access a network. Network device 670 connects to a network connection, such as network 102 in FIG. 1. The network connection permits access to any type of network, such as a local area network (LAN), a wide area network (WAN), or the Internet.

Map marker overlap engine 610 receives data set 620. Map marker overlap engine 610 utilizes geospatial data in data set 620 to determine a pixel value for a plurality of points to be displayed in association with a given map display. Map marker overlap engine 610 converts geospatial data into pixel values for the given map display by determining the physical distance that is represented between pixels associated with the given map display. Map marker overlap engine 610 then converts the geospatial data, such as latitude and longitude coordinates, for each point or location in data set 620 into a pixel location to form a plotted point.

Map marker overlap engine 610 utilizes a known pixel size for a graphic marker to identify one or more set(s) of points that will result in overlapping graphical indicators when the graphical indicators for the set of points are displayed. A set of overlapping graphical indicators comprises at least one graphic indicator that will wholly or partially overlap one or more other graphic indicators when the graphic indicators representing each plotted point in the set of points are rendered/displayed in association with the map display in accordance with a pixel value for each plotted point. In other words, map marker overlap engine 610 determines a position for each graphic marker relative to a bounding box for a given map display and/or relative to every other graphic marker to be displayed and identifies graphic markers that will occupy one or more of the same pixel locations causing overlap of the graphic markers when the markers are rendered on a map display.

Map marker overlap engine 610 optimizes the display of overlapping indicators by consolidating overlapping indicators into a single consolidated marker linked to a result set list. A consolidated marker does not overlap any other rendered graphic marker. In other words, the pixels occupied by each consolidated graphic marker do not occupy the same pixel position as another graphic marker/indicator so that no consolidated graphic marker or unconsolidated graphic indicator is obscured or hidden behind another rendered graphic marker and/or indicator. The result set list is provided in a second display that is separate from the map display. The result set list is displayed in response to a user selection of the consolidated marker.

In accordance with another illustrative embodiment, the result set list is displayed in a second window in conjunction with the map display displayed in a first window on a display screen. In accordance with this example, a user can view the map display and the result set list simultaneously.

In accordance with another illustrative embodiment, the result set list is displayed in a bubble over the map display when a user positions a pointer, such as a mouse pointer, over the consolidated marker.

In order to convert geospatial data into pixel values for a given map display, the map marker overlap engine determines the dimensions of a bounding box for the given map display in pixels. The map marker overlap engine determines the geographic coordinates, such as latitude and longitude, for each point in a data set. The map marker overlap engine establishes the pixel location for each point in the plurality of points represented by information in the data set rather than a latitude and longitude location in order to determine whether points will overlap when graphic indicators for the points are displayed on the given map display. In other words, visual overlap cannot be determined based on geographic coordinates alone except where geographic coordinates are identical due to differences in the magnification level of different zoom levels for a map display.

Map marker overlap engine determines whether each pair of plotted points in the plurality of plotted points are overlapping graphic indicators. In accordance with this illustrative example, approximately $N_2$ overlap detection determinations are made. For example, if the plurality of plotted points includes only four points, then sixteen (16) overlap determinations are made. In accordance with another illustrative embodiment, the number of overlap determinations can be optimized. Thus, if there are four plotted points in the plurality of plotted points, A, B, C, and D, then map marker overlap engine performs an overlap detection determination as to each of the following pairs of points: A and B, A and C, A and D, B and A, B and C, B and D, C and A, C and B, C and D, D and A, D and B, and D and C. Therefore, a minimum of twelve (12) overlap-detection determinations are made rather than sixteen (16).

After comparing all points in the plurality of plotted points, map marker overlap engine determines which plotted points will result in overlapping graphic indicators if the graphic indicators for the plotted points are displayed. Map marker overlap engine identifies set(s) of points that will result in overlapping graphic indicators when displayed to form a set of overlapping graphic indicators. Each graphic indicator in the set of overlapping graphic indicators overlaps with at least one other graphic indicator in the set of graphic indicators.

Each identified set of points determined to result in overlapping graphical indicators if the graphical indicators for the set of points are displayed is plotted for display as a single consolidated marker. The consolidated marker is a pre-generated image.

Map marker overlap engine plots the set of overlapping graphic indicators for display as a single consolidated marker by calculating a central point or centroid of a bounding polygon associated with the set of overlapping indicators representing the set of points. A bounding polygon is the smallest polygon shaped box enclosing the known pixel size for the set of graphic indicators representing the set of points.

In accordance with an illustrative embodiment, each time a user changes a zoom level of a map display, the map marker overlap engine recalculates a pixel value for each point and performs a new set of overlap detection functions for each pair of plotted points to identify any sets of overlapping graphical indicators.

In accordance with another illustrative embodiment, a user can click on the consolidated graphic marker to select a fanned out display option. A fanned out display option changes a zoom level of the given map display to the appropriate magnification or zoom level at which each graphical indicator representing a point in the set of points represented by the consolidated graphic marker can be displayed without resulting in overlapping graphical indicators. In other words, each graphic indicator representing each point does not overlap any graphic indicator representing a point in the set of points when displayed on the map display. In accordance with this example, if a user clicks on a consolidated marker representing a set of points, the map marker overlap engine automatically changes the zoom level of the map display to a second zoom level at which each plotted point represented by the consolidated marker can be displayed as a non-overlapping and unconsolidated graphic indicator on the map display.

In accordance with another illustrative embodiment, each consolidated marker is configurable. A configurable consolidated marker can be configured by a user to indicate that a given consolidated marker represents multiple plotted points by changing a color of the graphic marker, changing a shape of the graphic marker, changing a border or outline of the graphic marker, adding a shading or shadow to the graphic marker, or any combination of changes to the graphic marker to indicate that the graphic marker is a consolidated graphic marker representing two or more plotted points.

A configurable graphic marker is a user configured graphic marker. In accordance with another illustrative embodiment, a configurable graphic marker is a pre-configured graphic marker with one or more default configurations that may be modified or altered by a user.

In accordance with another illustrative embodiment, an overlap detection determination is made based on a distance of a plotted point from a fixed reference point. A fixed reference point may be any point designated as a fixed reference point, including but not limited to, a center of a city, a body of water, a state, a country, a continent, and/or any other natural or artificial geographic location or point of interest.

Figure 7:
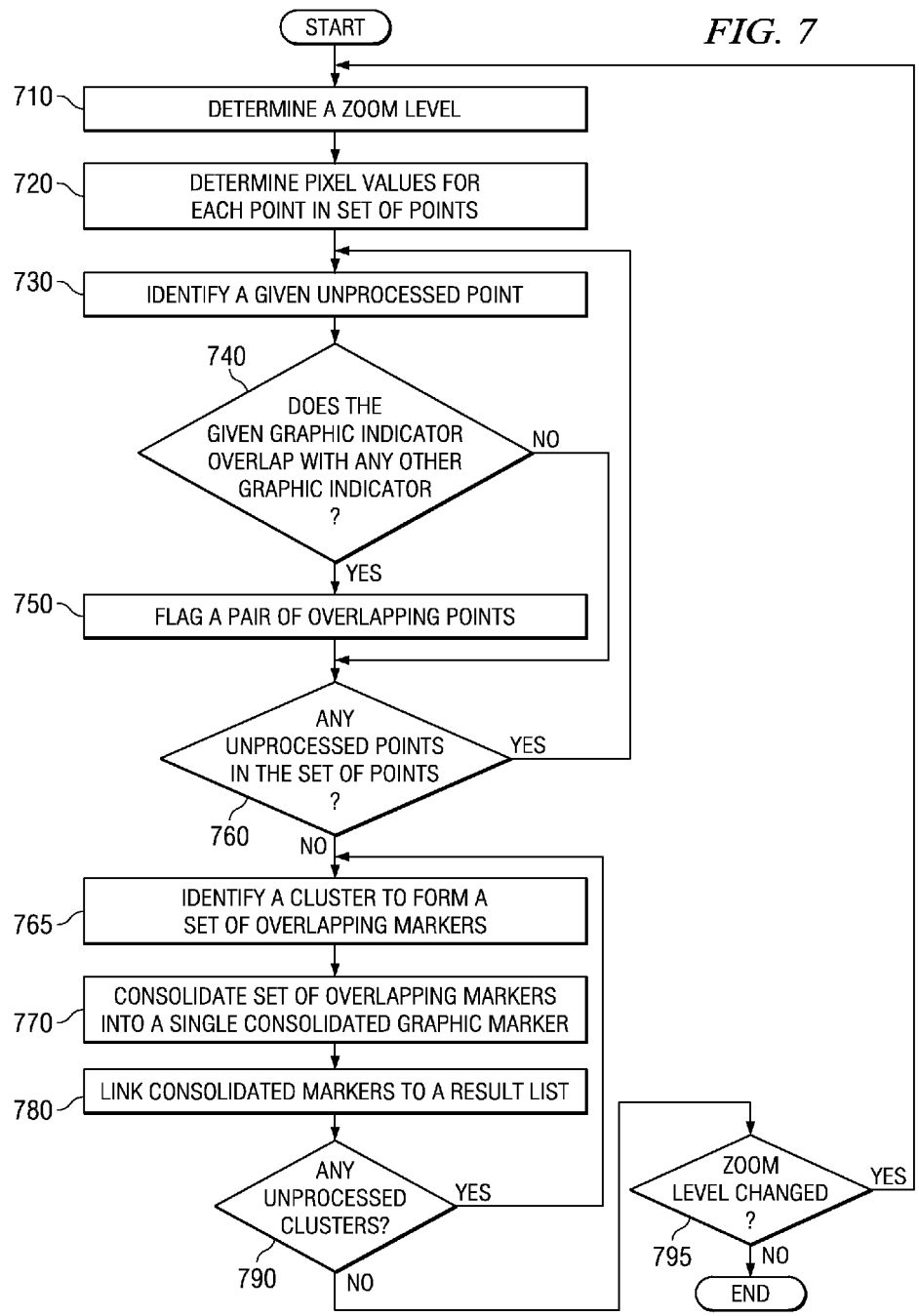
FIG. 7 is a flowchart illustrating a process for consolidating a set of overlapping graphic indicators into a single consolidated marker linked to a result set list in accordance with an illustrative embodiment.

FIG. 7 is a flowchart illustrating a process for consolidating a set of overlapping graphic indicators into a single consolidated marker linked to a result set list in accordance with an illustrative embodiment. The process is performed by a mapping application, such as map marker overlap engine 610 in FIG. 6.

The process begins by determining a zoom level for a given map display (step 710). The process next determines pixel values for each point in the set of points with associated geospatial data obtained from a data set (step 720) to from a plurality of plotted points. The process identified a given unprocessed point (step 730) in the plurality of points. As used herein, an unprocessed point is a point that has not been processed to determine if the graphic indicators for each point overlaps with any other graphic indicators for a point in the plurality of plotted points.

The process determines if a graphic indicator for the given plotted point overlaps with any other graphic indicator for a point in the plurality of plotted points (step 740). If the graphic indicator for the given point does overlap with any other graphic indicator or graphic marker, the process flags the pair of points (step 750) represented by the pair of overlapping graphic indicators. If the process determines that the graphic indicator for the given plotted point does not overlap with any other graphic indicator for a plotted point, the process determines if any other plotted points in the set of plotted points are unprocessed (step 760). If any plotted points are unprocessed points, the process returns to step 730 and continues to perform steps 730-760 iteratively until all plotted points are processed.

The process then identifies a cluster of overlapping graphic indicators to form a set of overlapping markers (step 765). A cluster of overlapping graphic indicators is a set of graphic indicators in which each graphic indicator for a plotted point overlaps with at least one other graphic indicator in the cluster. The process then consolidates the set of overlapping markers in the cluster to form a single consolidated graphic marker (step 770). The process links the consolidated marker to a result set list (step 780) providing information for and/or about the points represented by the consolidated marker.

The process next determines if any clusters of overlapping graphic indicators are unprocessed (step 790). An unprocessed cluster of overlapping graphic indicators is a cluster that has not been consolidated into a consolidated marker on the map display. If any unprocessed clusters are identified, the process returns to step 765 and performs steps 765-780 until all clusters of overlapping graphic indicators have been processed. The process then determines if a zoom level for the map display has been changed (step 795). If the zoom level has been changed, the process returns to step 710. If the zoom level has not been changed, the process terminates thereafter.

FIG. 8 is an example of an algorithm for converting geospatial data associated with a data set to pixel values to form a set of plotted points. The code shown in FIG. 8 is implemented by a mapping application, such as map marker overlap engine 510 in FIG. 5. Code 810 is an algorithm for a function to convert latitude and longitude coordinates of the map bounding box into a pixel value for the horizontal x-axis 820 and a pixel value for the vertical y-axis 830 of each point relative to the bounding box for the map display to form the plurality of plotted points.

The map marker overlap engine determines whether or not a graphic indicator for each point in each pair of plotted points overlaps with the other graphic indicator for the other point in the pair of plotted points. This determination is made for every plotted point by comparing a pixel value for each plotted point and a known graphic marker pixel size with a pixel value for every other plotted point in the plurality of plotted points. Thus, an overlap determination is made for each pair of plotted points for a total of $N_2$ comparisons, where N is the total number of plotted points in the plurality of plotted points. In accordance with an illustrative embodiment, the total number of comparisons is optimized such that the total number of comparisons is less than $N_2$ comparisons.

FIG. 9 is an overlap-detection function for identifying a pair of overlapping graphic indicators for a pair of points in accordance with an illustrative embodiment. The code shown in FIG. 9 is implemented by a mapping application, such as map marker overlap engine 510 in FIG. 5.

Code 900 is a pseudocode for an overlap-detection function to determine if a graphic indicator for a first plotted point overlaps with a graphic indicator for a second plotted point. Each plotted point has an associated graphic indicator of a known size. A comparison is made of the known dimensions of the bounding box of a graphic indicator to determine if the graphic indicator overlaps with the second graphic indicator. In accordance with pseudocode 910, if either a left bound or a right bound of a bounding box associated with the first graphic indicator, identified as graphic indicator A, falls between a left and right bounds of the bounding box for the second graphic indicator, identified as graphic indicator B, and either a top bound or a bottom bound of the first graphic indicator falls between an upper and lower bound of the bounding box associated with the second graphic indicator, then the two points are as points having overlapping graphic indicators at line of code 920. If the bounding boxes associated with the two graphic markers do not overlap at line of code 930, then the two plotted points represented by the two graphic markers are not identified as a pair of points having overlapping graphic indicators.

Thus, in accordance with this illustrative embodiment, the map marker overlap engine compares the known dimensions of the bounding boxes associated with two graphic markers representing two plotted points to determine if the bounding boxes overlap. If the bounding boxes overlap, then map marker overlap engine flags the pair of plotted points as points associated with a pair of overlapping graphic indicators at the given zoom level. The pair of points form a set of points determined to result in overlapping graphic indicators if the graphic indicators for the points are displayed on the map display at the given zoom level.

When large data sets representing a plurality of points are mapped, the graphic indicators may overlap when displayed on a map display if two or more points actually have the same location and/or graphic indicators representing the points overlap due to the zoom level of the map view. The overlapping of graphic indicators or icons representing points on a map results in problems because the overlap hides or obscures some of the data intended to be represented by overlapping indicators. This obscuring of data can cause confusion to a user. Thus, the aspects of the illustrative embodiments provide a method, apparatus, and computer program product for consolidating overlapping indicators in a mapping application and linking the consolidated marker to a second display that provides a listing of the points represented by the consolidated marker. A user can change a zoom level of a map and consistently view a listing of all points represented by each consolidated marker on a map display without encountering overlapping of graphic indicators. Thus, the aspects of the illustrative embodiments prevent obscuring of data and provide consistent information regarding plotted points and location information association with a map display regardless of a zoom level selected by a user.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for consolidating overlapping markers in a mapping application, the computer implemented method comprising:

identifying a plurality of points for display from data describing locations and associated data about locations;

determining whether displaying graphical indicators for a set of points in the plurality of points will result in graphical indicators overlapping each other;

responsive to a determination that displaying graphical indicators for the set of points will result in graphical indicators overlapping each other, generating a consolidated marker for the set of points, wherein the consolidated marker represents each point in the set of points that is associated with a set of overlapping graphical indicators, wherein the consolidated marker is a graphic that is divided into subparts for each of the overlapping points, wherein each of the overlapping points is associated with one of the subparts of the consolidated marker, and wherein each of the overlapping points is identified by an identifier displayed in one of the subparts of the consolidated marker; and associating a listing for the set of points with each of the overlapping points identified in the subparts of the consolidated marker, wherein the listing comprises at least a portion of the associated data about locations for the plurality of points, and wherein the listing includes the associated data about the locations that identifies each point in the set of points represented by the consolidated marker.

2. The computer implemented method of claim 1 further comprising:

determining whether a given pair of graphical markers associated with a pair of points overlap based on a distance between pixels associated with the pair of points relative to a bounding box of the map display.

3. The computer implemented method of claim 1 further comprising:

determining whether a given pair of graphical markers associated with a pair of points overlap based on a distance between the pair of points and a fixed reference point.

4. The computer implemented method of claim 1 further comprising:

determining if a graphical marker for a given plotted point in the plurality of plotted points overlaps with any other graphical marker associated with the map display.

5. The computer implemented method of claim 1 further comprising:

determining a zoom level for the map display.

6. The computer implemented method of claim 1 wherein geospatial data comprises longitude and latitude coordinates for a given point.

7. The computer implemented method of claim 1 wherein the consolidated marker is a pre-generated graphic image.

8. The computer implemented method of claim 1 further comprising:

displaying the consolidated marker at a central point associated with the set of overlapping graphic indicators.

9. The computer implemented method of claim 1 further comprising:

responsive to a user selecting the consolidated marker, changing a first zoom level of the map display view to a second zoom level, wherein each point represented by the consolidated marker is represented by an unconsolidated, non-overlapping graphical indicator at the second zoom level.

10. The computer implemented method of claim 1 wherein the consolidated marker is a user configurable graphic image.

11. The computer implemented method of claim 1 wherein the consolidated marker does not overlap with any other graphical indicator.

12. The computer implemented method of claim 1 further comprising:

displaying the listing for the set of points in response to a user selecting the consolidated marker.

* * * * *